June 27, 1933. H. SOMERVELL 1,916,083
TRUCK
Filed June 20, 1932 14 Sheets-Sheet 1
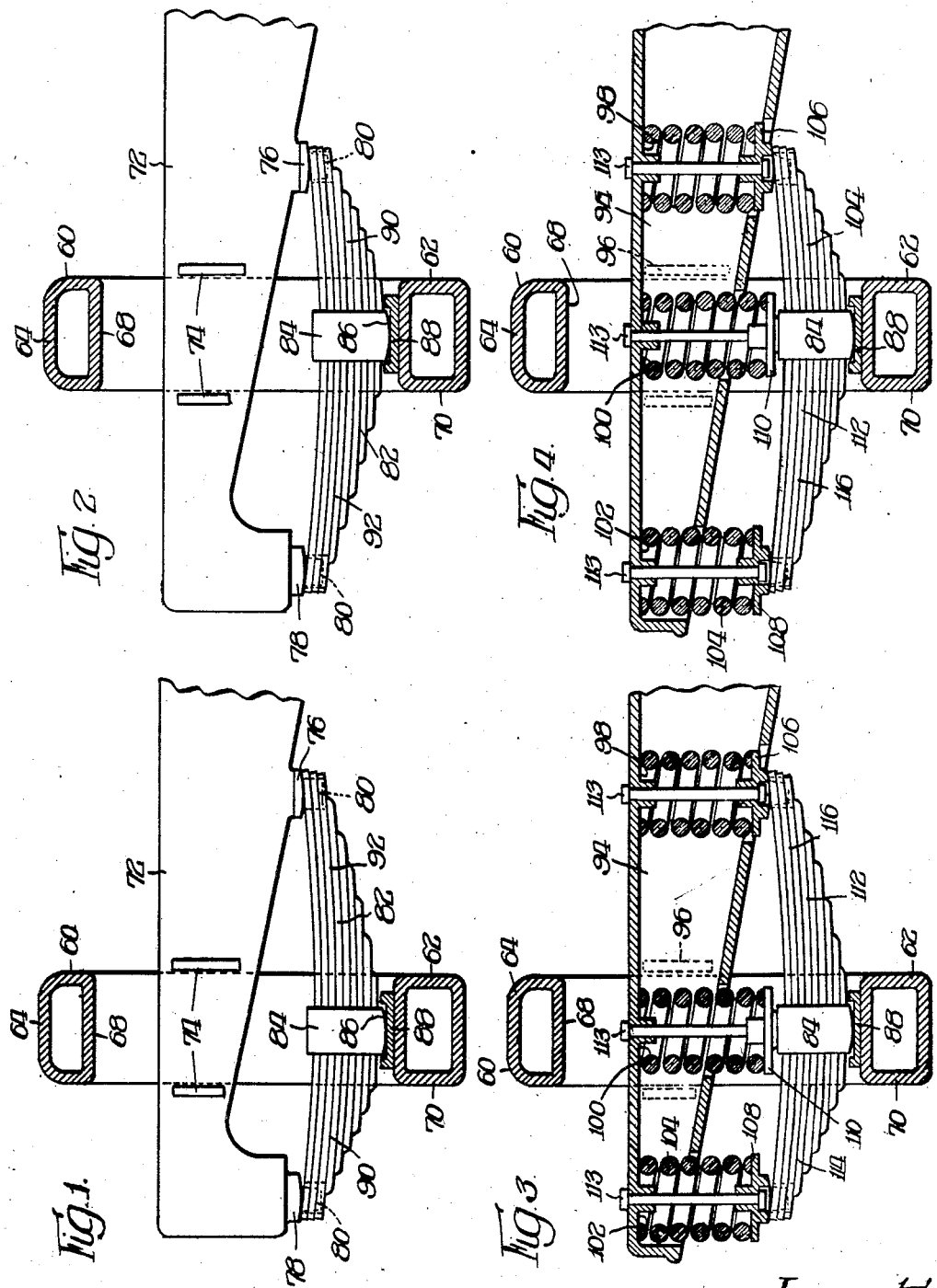
Inventor
Howard Somervell

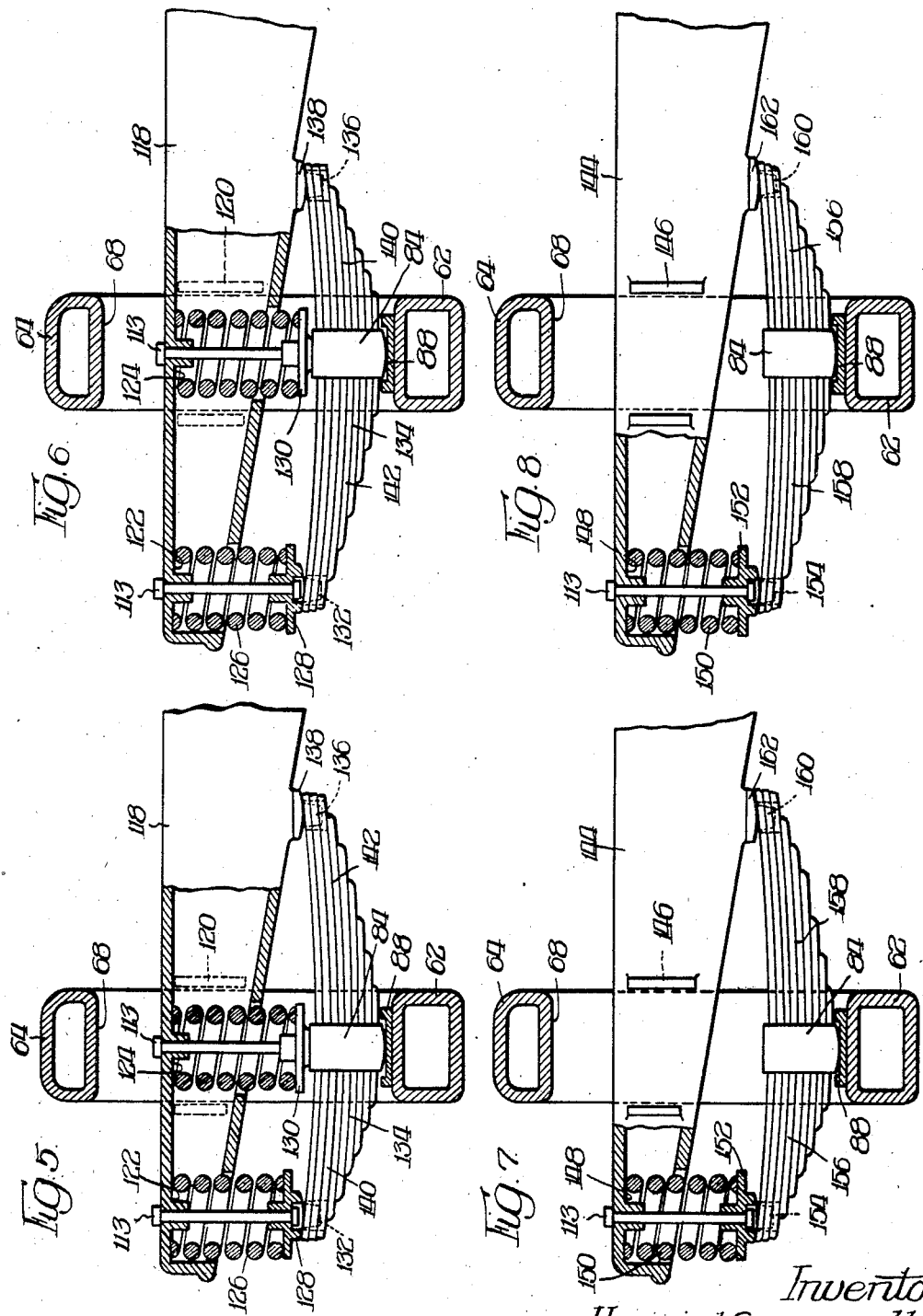

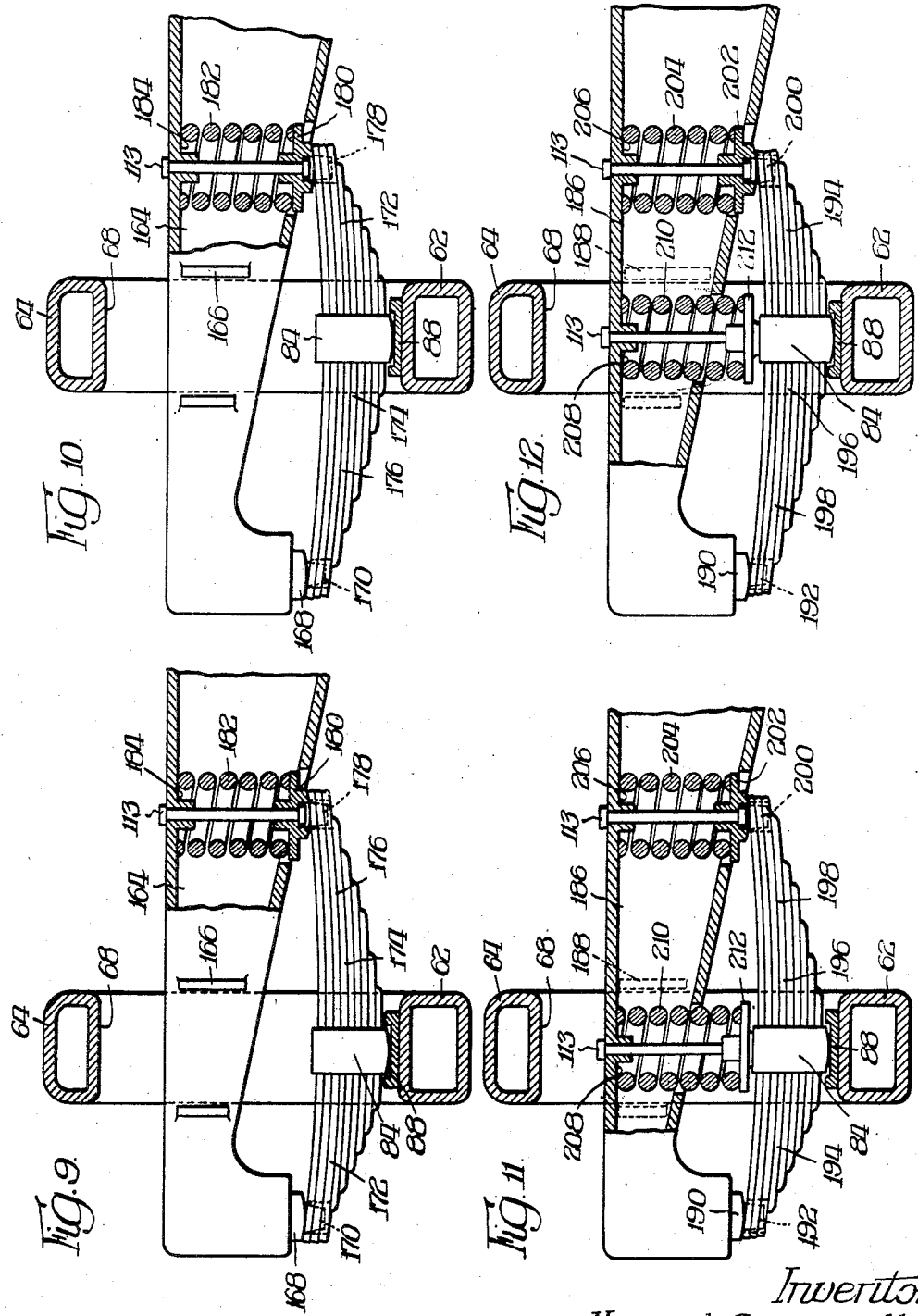

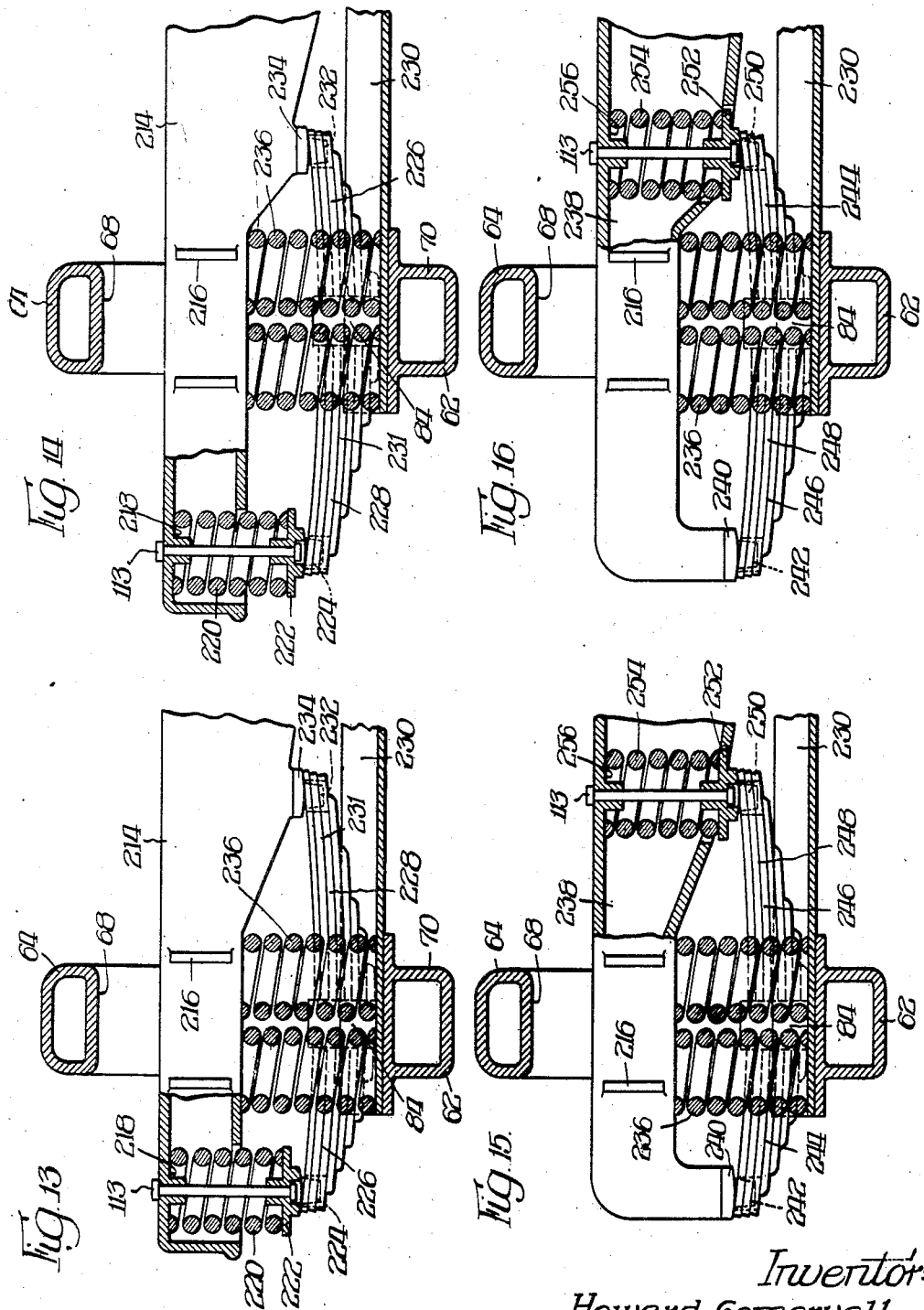

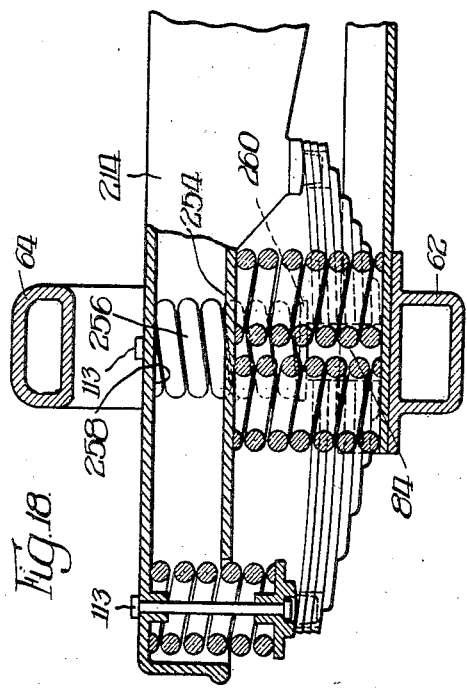
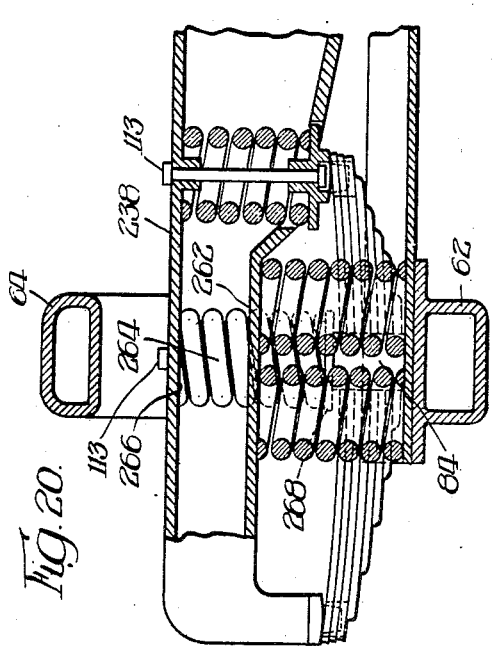
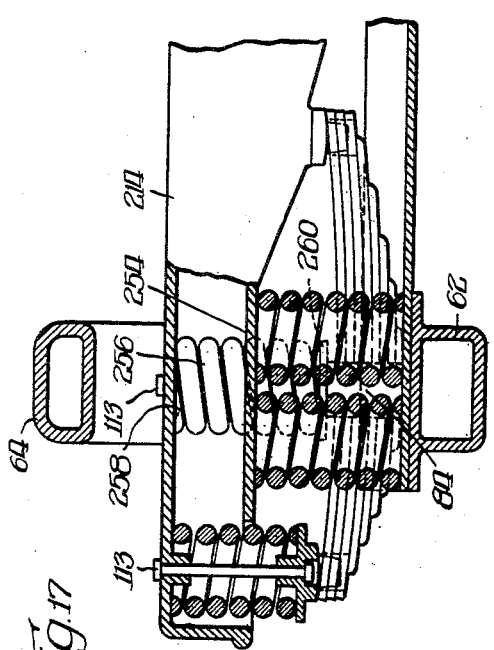
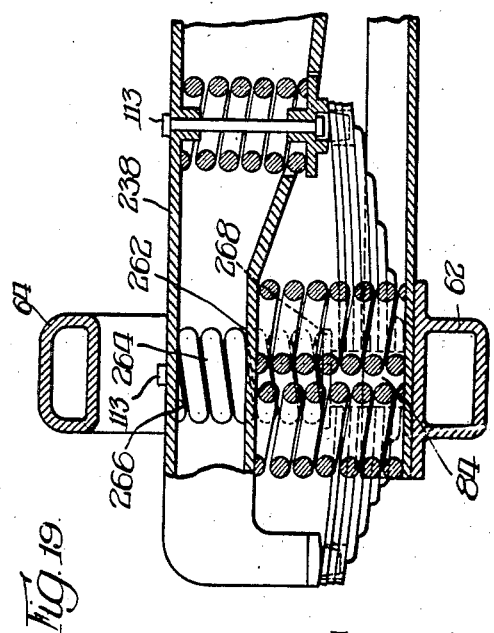

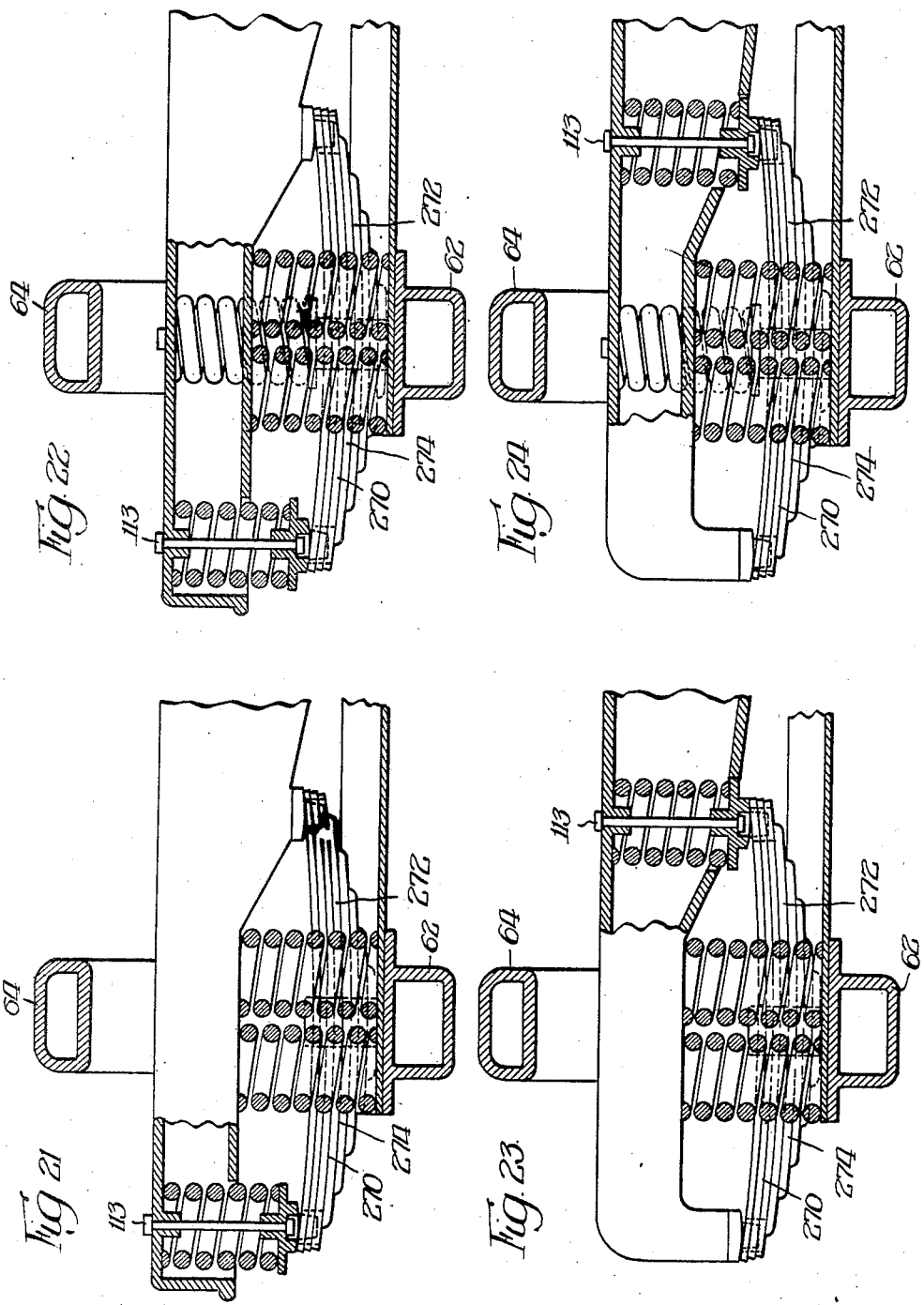

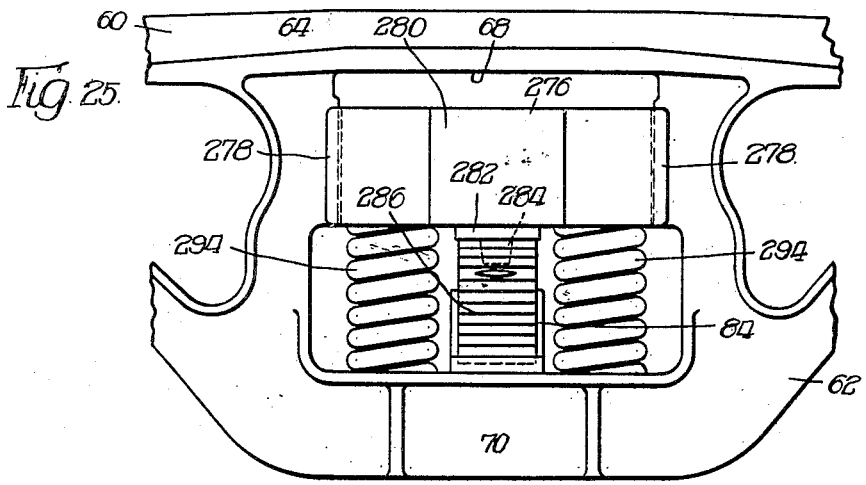
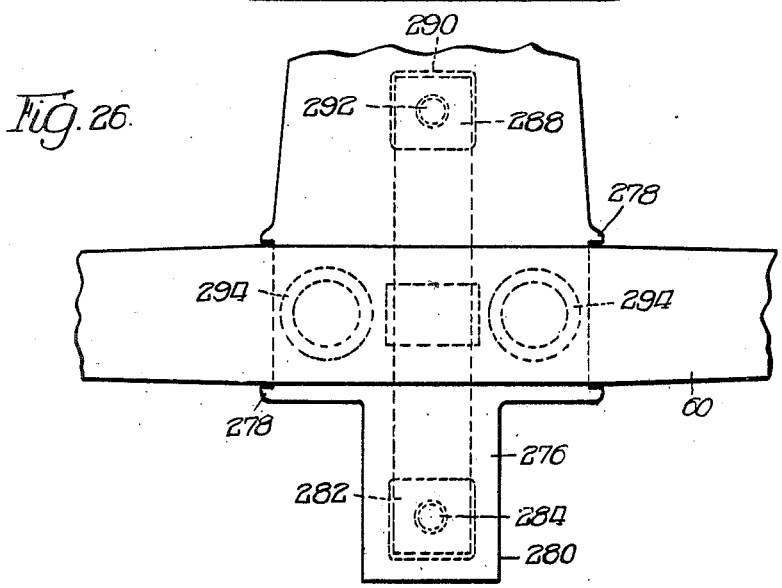
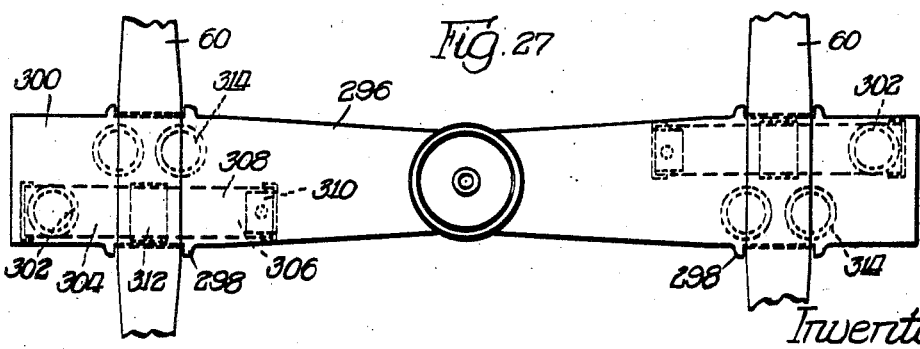

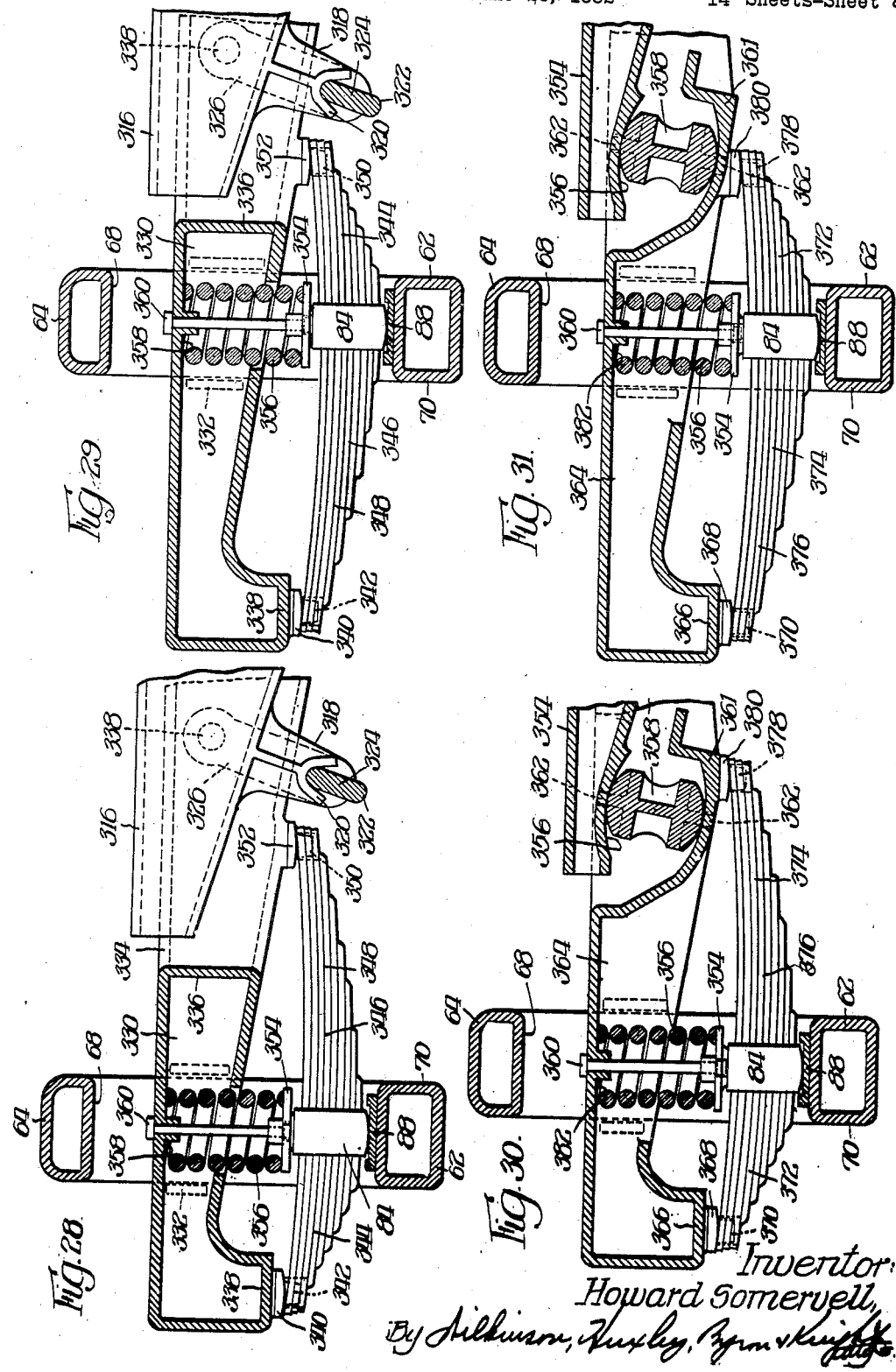

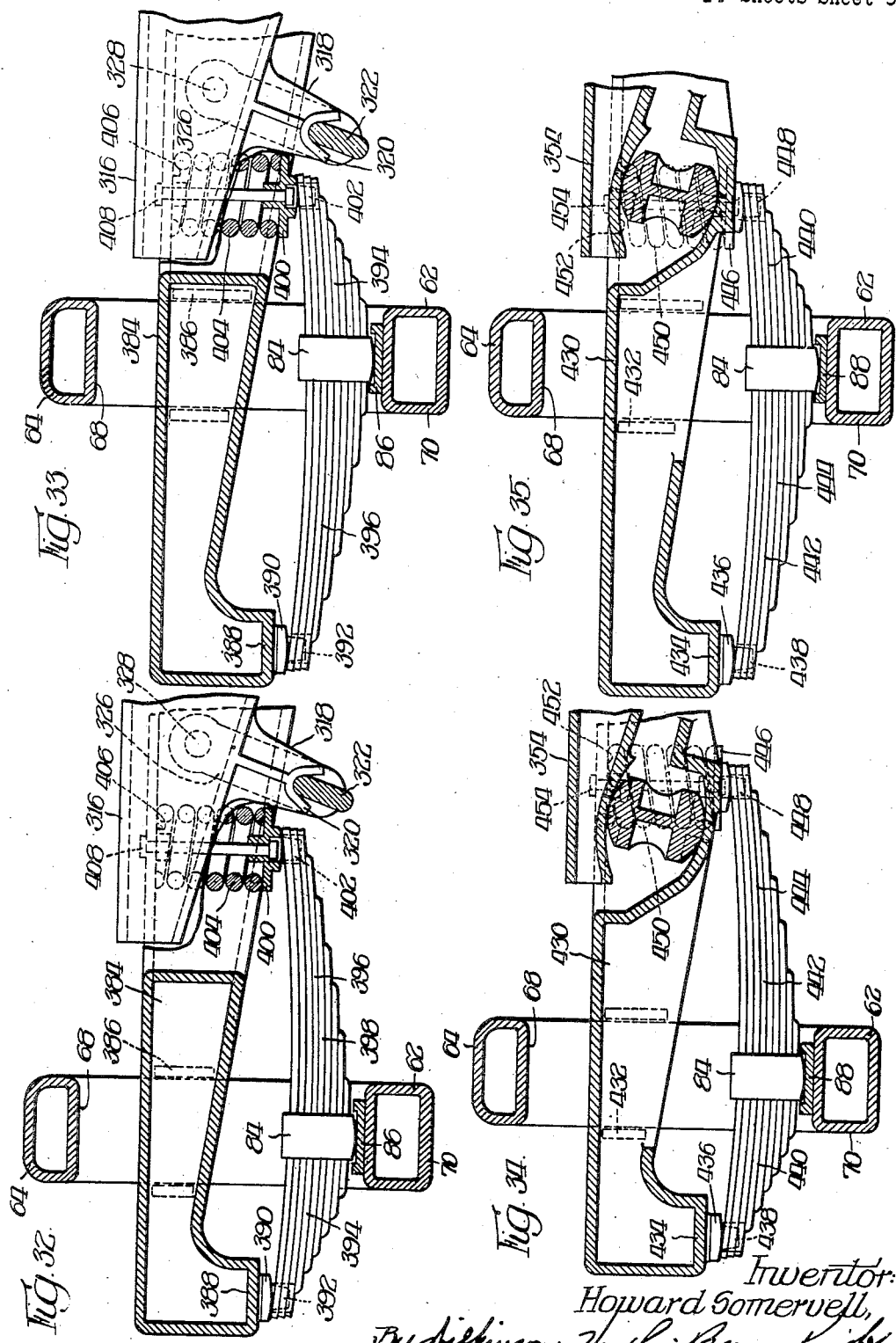

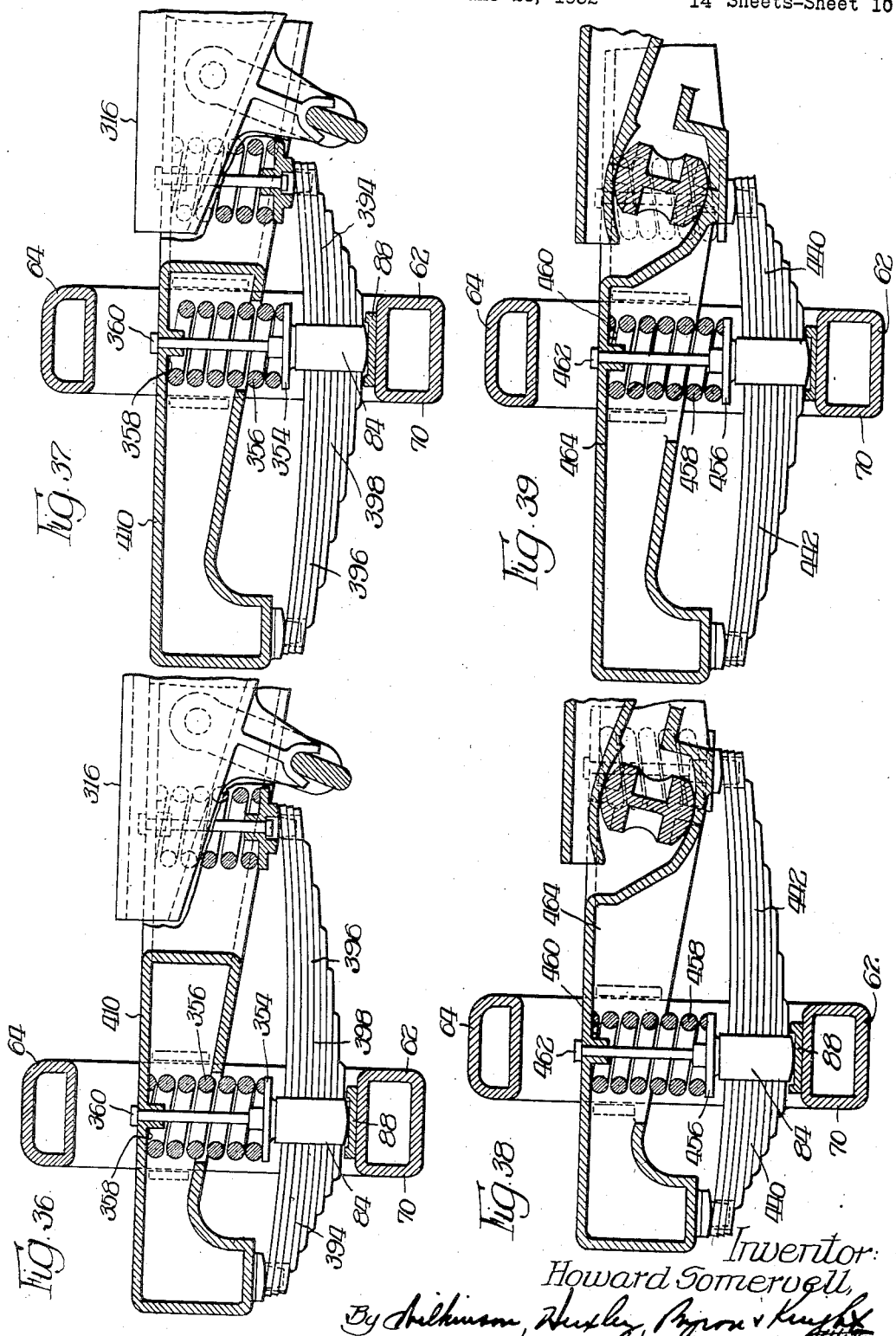

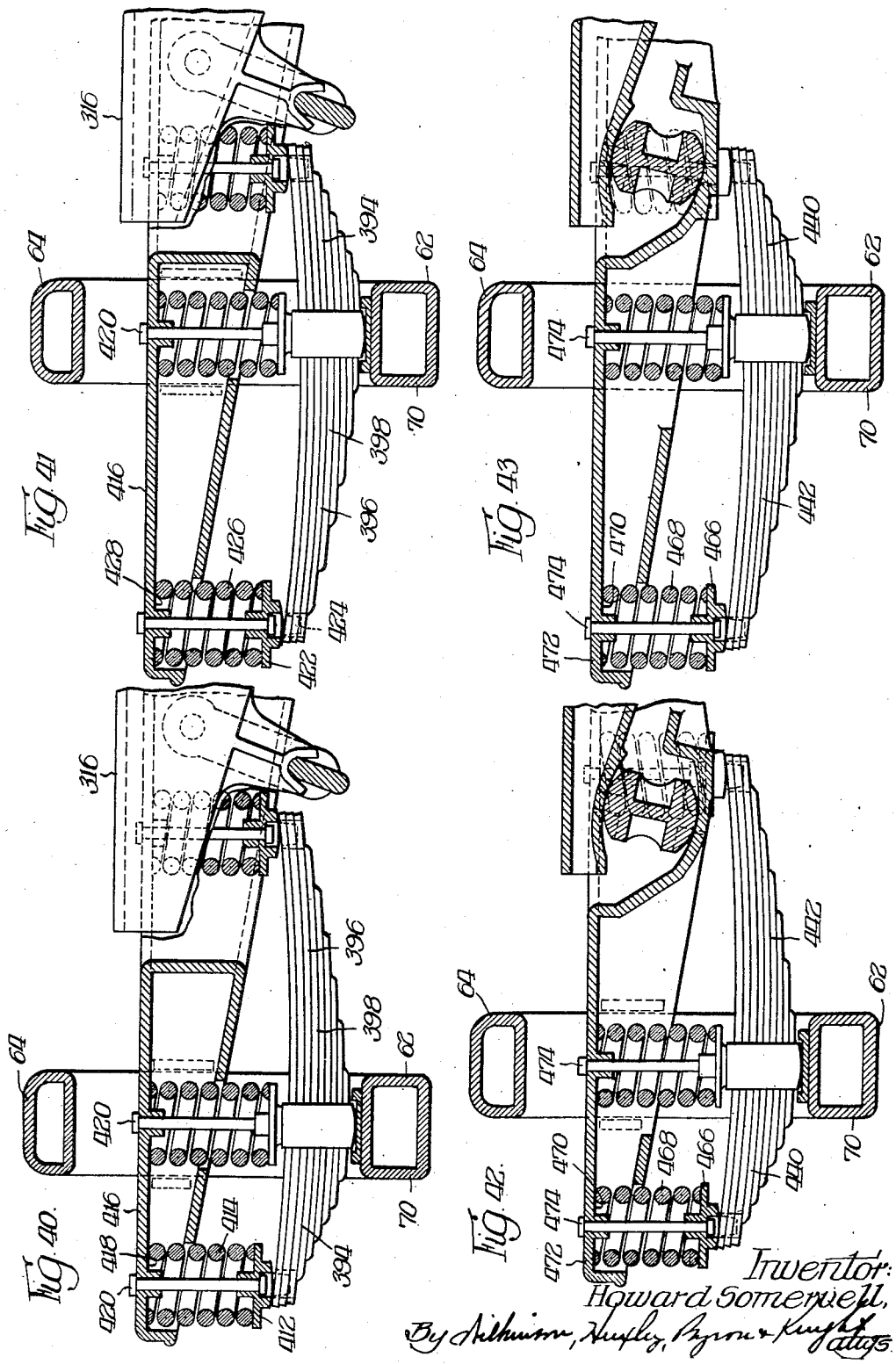

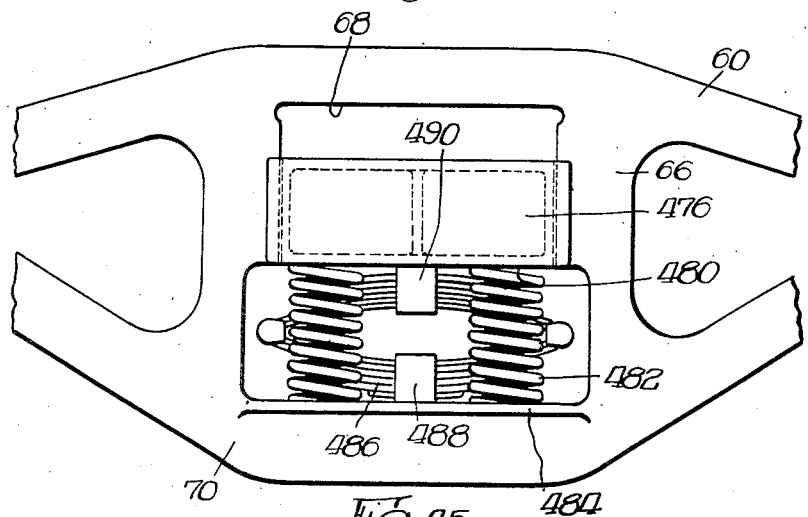
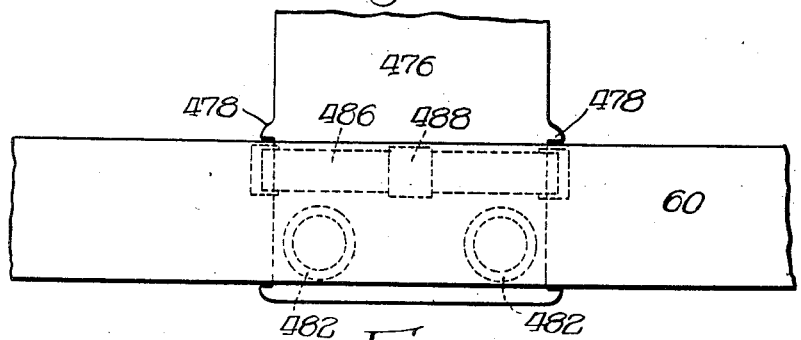
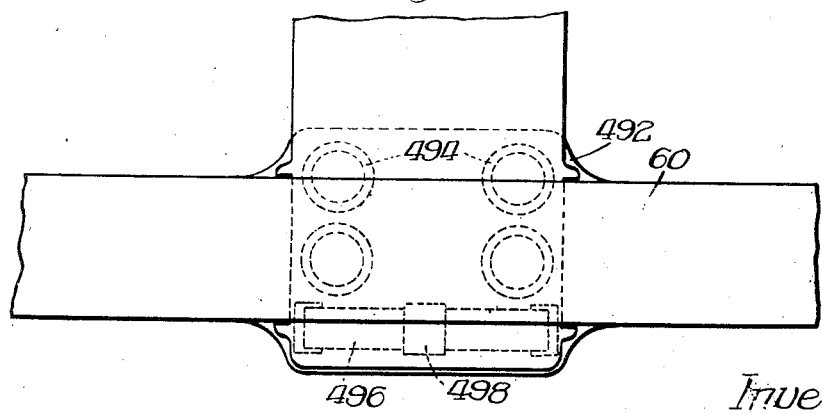

June 27, 1933. H. SOMERVELL 1,916,083
TRUCK
Filed June 20, 1932 14 Sheets-Sheet 13
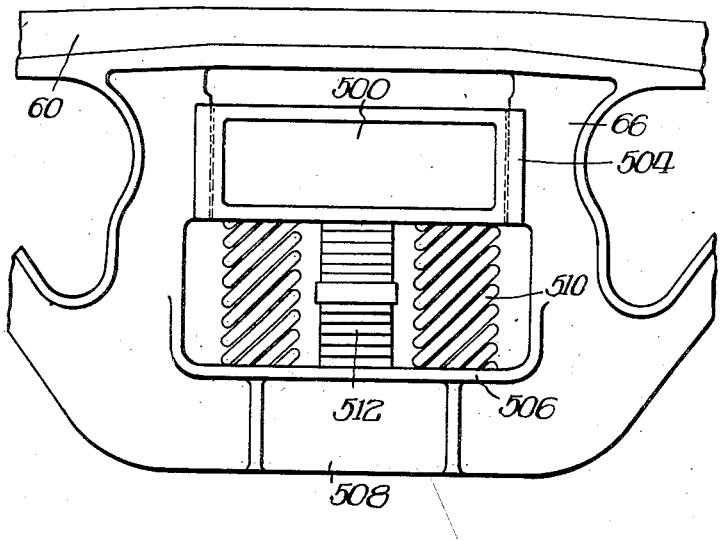
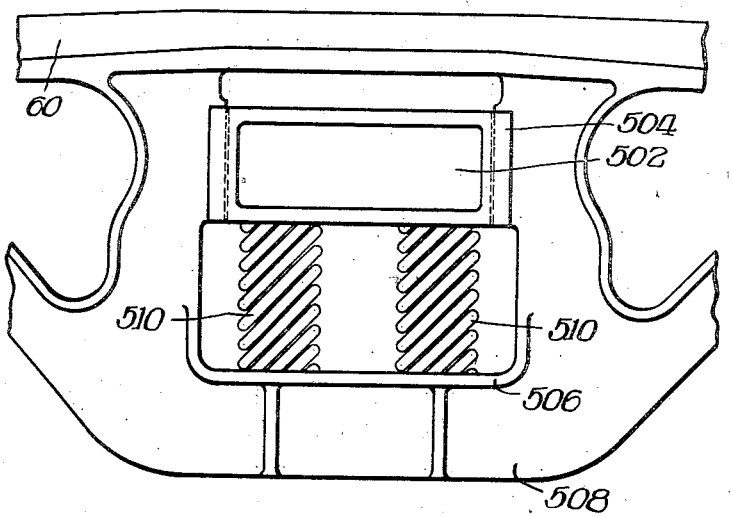
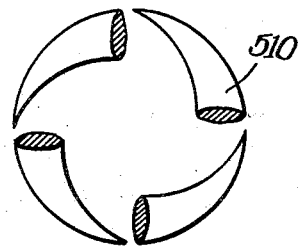
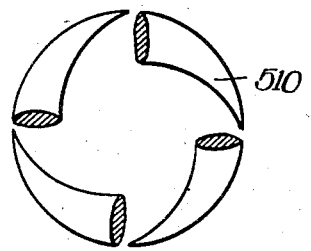
Inventor:
Howard Somervell,

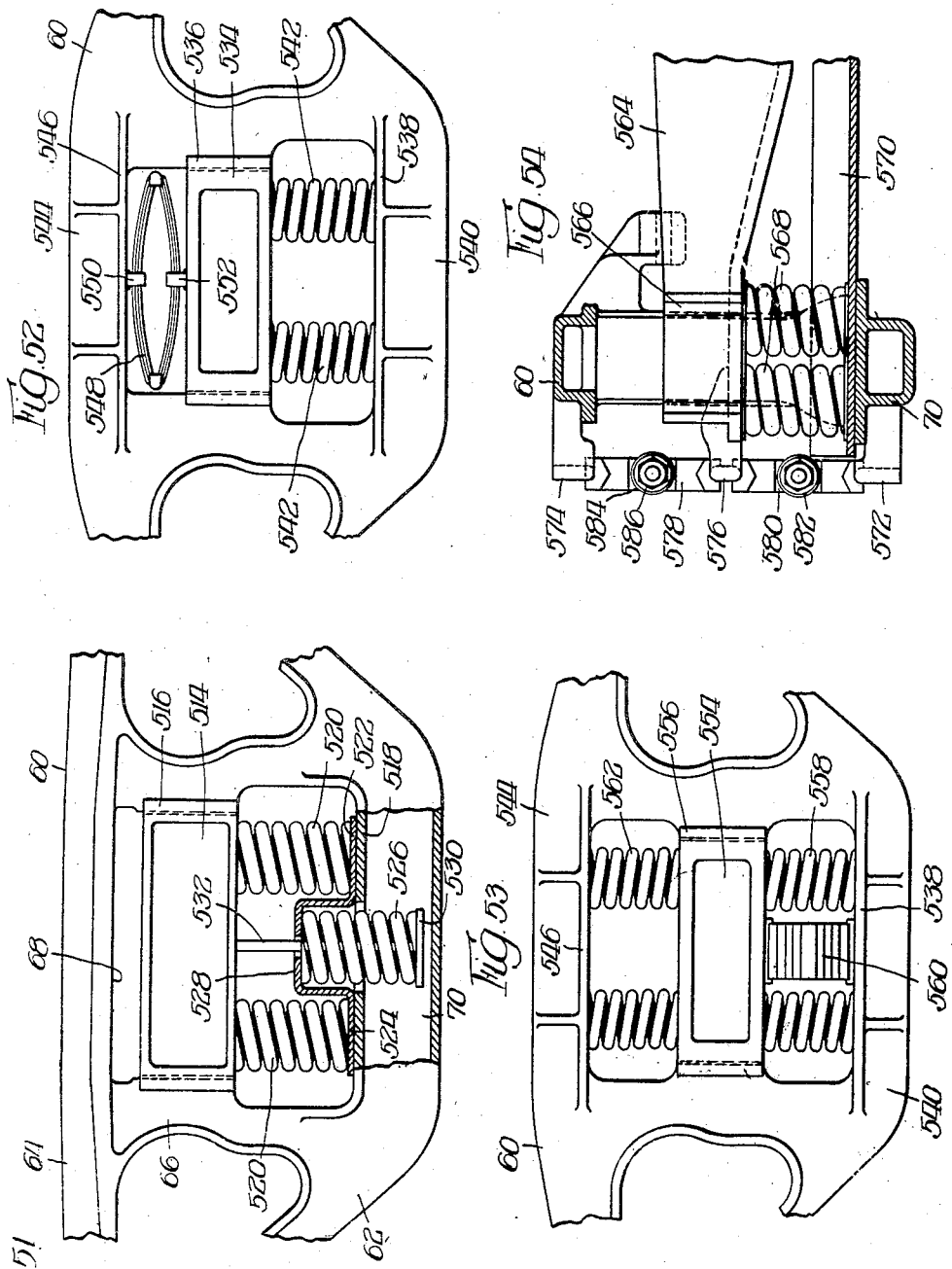

Patented June 27, 1933

1,916,083

UNITED STATES PATENT OFFICE

HOWARD SOMERVELL, OF EVANSTON, ILLINOIS, ASSIGNOR TO AMERICAN STEEL FOUNDRIES, OF CHICAGO, ILLINOIS, A CORPORATION OF NEW JERSEY

TRUCK

Application filed June 20, 1932. Serial No. 618,247.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car; the resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series; the coil springs responding to the light, quick shocks, the leaf springs to the slow, heavy impulses. Coil springs are quick and sensitive, leaf springs relatively less so, in response. For this reason, and also by providing coil and leaf springs of different natural vibration periods, they tend to dampen each other's synchronous vibration without impairing free spring response. This condition is obtained by having the different springs in series. Placing leaf and coil springs in parallel is not generally sufficient in an ordinary truck, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

A passenger car truck also contributes to easy riding by having the bolster suspended on inclined swing hangers for lateral motion to soften lateral shocks, but this construction is commonly considered too complicated and costly for freight car trucks.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series without complete duplication of carrying capacity in each kind.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

Yet another object is to provide a car truck having a simple and economical lateral motion bolster construction having an action similar to that with inclined swing hangers.

A yet further object is to provide a truck construction wherein resilient pads are provided for dampening out metallic vibrations transmitted through the metallic truck parts, and also for the purpose of deadening noise.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

Another different object is to provide a car truck wherein the action of the bolster or other load carrying member is snubbed.

With these and various other objects in view, the invention may consist of certain novel features of construction and operation, as will be more fully described and particularly pointed out in the specification, drawings and claims appended hereto.

In the drawings, which illustrate embodiments of the device and wherein like reference characters are used to designate like parts—

Figures 1 to 24 inclusive, are fragmentary transverse sectional elevations through truck constructions embodying the invention;

Figure 25 is a fragmentary side elevation of another modified form of truck construction embodying the invention;

Figure 26 is a fragmentary top plan view of the truck construction shown in Figure 25;

Figure 27 is a fragmentary top plan view of another modified form of truck construction;

Figures 28 to 43 inclusive, are fragmentary transverse sectional elevations through further modified forms of truck constructions embodying the invention;

Figure 44 is a fragmentary side elevation of another form of truck construction embodying the invention;

Figure 45 is a fragmentary top plan view of the truck construction shown in Figure 44;

Figure 46 is a view corresponding to Figure 45 showing another arrangement thereof;

Figure 47 is a fragmentary side elevation of another form of truck construction embodying the invention;

Figure 48 is an elevation corresponding to Figure 47 showing a modification thereof;

Figures 49 and 50 are enlarged sectional plans of the top and bottom terminations of the springs shown in Figures 47 and 48;

Figure 51 is a fragmentary side elevation of yet another form of truck construction embodying the invention showing the application thereto of a snubbing device;

Figures 52 and 53 are fragmentary side elevations of other forms of trucks embodying snubbing devices;

Figure 54 is a fragmentary transverse sectional elevation through a truck construction embodying snubbing and shock absorbing devices.

This application is a continuation in part of application Serial No. 559,848, filed August 28, 1931, and application Serial No. 561,535, filed September 8, 1931.

In the truck constructions illustrated in Figures 1 to 51 inclusive, the side frame 60 is of the truss type and consists essentially of the tension member 62 and the compression member 64 which merge adjacent their ends and are provided with the usual journal boxes (not shown) the tension and compression members being integrally connected by means of the spaced column guides 66 spaced apart to form the window 68, the portion of the tension member between the column guides forming the spring seat 70.

In the constructions shown in Figures 1 and 2, the bolster 72 extends through the window, being provided with suitable column guide cooperating members 74, and provided with inner and outer spring seat members 76 and 78 having depending dowels 80 adapted to be received in suitable openings formed in the semi-elliptic leaf spring assembly 82. The leaf spring assembly is formed with the spring band 84, the spring bands of all the constructions herein described being preferably provided with the arcuate surfaces 86 cooperating with the seat 88 supported on the spring seat 70. In the construction shown in Figure 1, the outer leg 90 of the spring assembly is shorter than the inner leg 92 thereof in order to give a differential supporting action to the bolster. In the construction shown in Figure 2, the shorter leg 90 is disposed inwardly and the longer leg 92 disposed outwardly, the bolster being lengthened correspondingly.

In Figure 3 the bolster 94 extends through the window and is provided with guide cooperating members 96, the bolster being provided on the top chord thereof with spaced spring seats 98, 100 and 102 for accommodating coil springs 104 disposed between said seats, and inner, outer and intermediate seats respectively 106, 108 and 110 supported on the inner and outer legs of the leaf spring assembly 112, the seat 110 being supported on the spring band 84 disposed on the seat 88. Each spring and seat assembly is preferably provided with a bolt 113 for facilitating assembly thereof. In this case the outer leg 114 is shorter than the inner leg 116 in order to provide the differential action. This construction provides springs in series and parallel to afford an easy riding truck.

In the construction shown in Figure 4, the long leg 116 is disposed outwardly, and the short leg 114 is disposed inwardly, the bolster being proportioned accordingly.

In Figure 5 the bolster 118 extends through the window and is provided with guide cooperating members 120, the bolster being provided on the top chord thereof with spaced seats 122 and 124 for accommodating the coil springs 126 disposed between said seats and seat members 128 and 130. The seat member 128 is provided with a positioning dowel 132 receivable in an aperture in the outer leg of the leaf spring 134. The inner leg thereof receives the depending dowel 136 of the seat 138 provided on the lower chord of the bolster 118. Seat 130 is positioned in a similar manner as the seat 128 on the spring band 84 supported on the seat 88. The outer leg 140 is the shorter leg, and the inner leg 142 is of longer construction.

In the construction shown in Figure 6, the long leg 142 is disposed outwardly and the short leg 140 is disposed inwardly, the bolster being proportioned accordingly.

In Figure 7 the bolster 144 extends through the window and is provided with the guide cooperating members 146, the bolster being provided on the top chord thereof with the outer seat 148 for accommodating the coil spring 150. The coil spring 150 is provided between the seat 148 and the seat member 152 having the positioning dowel 154 receivable in a suitable aperture provided in the outer leg 156 of the semi-elliptic leaf spring assembly 158, the inner leg thereof being apertured for the reception of the depending dowel 160 of the seat 162. As before, the leaf spring assembly is provided with the spring band 84 supported on the seat 88. The outer leg 156 is the shorter of the two legs.

In the construction shown in Figure 8, the long leg 158 is disposed outwardly and the short leg 156 is disposed inwardly, the bolster being proportioned accordingly.

In Figure 9 the bolster 164 extends through the window and is provided with the guide cooperating portions 166, the bolster being provided with the spring seat 168 disposed outwardly of the side frame, said seat being provided with the depending dowel 170 receivable in the outer leg 172 of the semi-elliptic leaf spring assembly 174. The spring is provided with the spring band 84 adapted to be supported on the inner leg of the leaf spring assembly and is apertured for the reception of the depending dowel 178 of the coil spring seat 180. The coil spring 182 is disposed between the coil spring seat 188 and the spring seat 184 provided on the upper chord of the bolster. The inner leg of the leaf spring is the longer of the two legs.

In the construction shown in Figure 10 the long leg 176 is disposed outwardly, and the short leg 172 is disposed inwardly, the bolster being proportioned accordingly.

In Figure 11 the bolster 186 extends through the window, being provided with the guide cooperating members 188. The bolster is provided with the spring seat 190 outwardly of the side frame, said seat being provided with the depending dowel 192 receivable in a suitable aperture in the leg 194 of the semi-elliptic leaf spring assembly 196. The leaf spring band 84 is supported on the seat 88. The inner leg 198 of the leaf spring assembly is apertured for the reception of the depending dowel 200 provided on the spring seat 202. The coil spring 204 is disposed between seat 202 and seat 206 provided on the upper chord of the bolster. The bolster is also provided with the coil spring seat 208 disposed substantially in the plane of the side frame, the coil spring 210 being disposed between said seat and a seat 212 supported on the spring band. In this construction the short leg 194 is disposed outwardly and the long leg 198 is disposed inwardly.

In the construction shown in Figure 12, the long leg 198 of the spring assembly 196 is disposed outwardly of the side frame, and the short leg 194 is disposed inwardly, the bolster being proportioned accordingly.

In Figure 13, the bolster 214 extends through the window, being provided with suitable guide cooperating members 216, the bolster being provided at the top chord thereof with the coil spring seat 218 adapted to accommodate the coil spring 220 seated on the seat 222. The seat 222 is provided with a depending dowel 224 adapted to be received in a suitable aperture formed in the outer leg 226 of the semi-elliptic leaf spring assembly 228. The leaf spring assembly is provided with a spring band 84 receivable in a suitable seat provided on the spring plank 230 which is supported on the spring seat portion 70. The inner leg 231 of the leaf spring assembly is apertured for the reception of the positioning dowel 232 provided on the seat 234 provided on the bolster 214 inwardly of the side frame.

The bolster is also adapted to be supported on the side frame through the nests of coil springs 236 supporting the bolster in parallel with the leaf spring 228 and the coil spring 220, the coil spring 220 being arranged in series with the leaf spring. It is of course to be understood that the coil springs 236 may be arranged on either side of the leaf spring 228, or pairs of leaf springs 228 may be arranged on either side of the coil springs 236. The outer leg 226 is shown shorter than the inner leg 231 to give a differential action to the leaf spring.

In the construction shown in Figure 14 the long leg 231 is disposed outwardly of the side frame, and the short leg 226 is disposed inwardly of the side frame, the parts being proportioned accordingly.

In Figure 15 the bolster 238 extends through the window 68, being provided with suitable guide cooperating members. The bolster is provided with the spring seat 240 disposed outwardly of the side frame, said seat being provided with a depending dowel 242 receivable in a suitable aperture in the outer leg 244 of the semi-elliptic leaf spring assembly 246. The leaf spring is provided with the spring band 84 supported on a suitable seat on the spring plank 230. The inner leg 248 of the leaf spring is apertured for the reception of the depending dowel 250 provided on the coil spring seat 252. A coil spring 254 is seated on said seat and supports the bolster 238 on the bolster seat 256 provided on the top chord of said bolster. A suitable positioning bolt is provided between the bolster and the spring seat 252. The bolster is also supported by the coil springs 236 arranged in parallel with the semi-elliptic spring 246 in a manner already described. These coil springs may be positioned either embracing the leaf spring, or embraced by the leaf spring. The outer leg 244 is shorter than the inner leg 248 to give a proper differential action.

In the construction shown in Figure 16, the outer leg 248 is the longer leg, and the inner leg 244 which supports the spring seat 252 is the shorter leg.

The construction shown in Figure 17 is similar to that shown in Figure 13, with the exception that the bolster 214 is apertured as at 254 on the lower chord thereof in the plane of the side frame for the reception of a coil spring 256 supporting the bolster on the seat 258 of the top chord thereof, the lower end of the coil spring being seated on the seat member 260 supported on the spring band 84.

The construction shown in Figure 18 is similar to that shown in Figure 14, with the exception that here, as in Figure 17, the coil spring 256 supports the bolster 214 at the seat 258, and is supported on the spring band 84 by the seat member 260.

The constructions shown in Figures 19 and 20 respectively, are similar to those shown in Figures 15 and 16, with the exception that the bolster 238 is suitably apertured as at 262 so that the coil spring 264 supports the bolster 238 at the seat 266 provided on the upper chord of the bolster. The coil spring is supported on the seat member 268 supported on the spring band 84.

The construction shown in Figure 21 is similar to that shown in Figure 13, with the exception that in place of using a semi-elliptic spring of unequal legs, a semi-elliptic spring 270 is provided, the inner leg 272 being of the same length as the outer leg 274.

The construction shown in Figure 22 is similar to that shown in Figure 17, with the exception that instead of a semi-elliptic leaf spring having legs of unequal length, the semi-elliptic spring 270 is provided with the inner leg 272 of the same length as the outer leg 274.

The construction shown in Figure 23 is similar to that shown in Figure 15, with the exception that the legs 272 and 274 of the semi-elliptic leaf spring 270 are of equal length.

The construction shown in Figure 24 is similar to that shown in Figure 20, with the exception that the legs 272 and 274 of the semi-elliptic leaf spring 270 are of equal length.

In the construction shown in Figures 25 and 26, the bolster 276 has column guide cooperating members 278, and has a seat portion 280 extending outwardly of the side frame 60. The seat portion 280 is provided with the seat member 282 having a positioning dowel 284 received in a suitable aperture in the semi-elliptic leaf spring assembly 286. The semi-elliptic leaf spring assembly is provided with the spring band 84 and is suitably supported in a seat provided on the side frame. The inner leg 288 of the semi-elliptic leaf spring assembly, which may be of equal length or shorter, or longer, than the outer, is likewise positioned on the bolster by means of a seat member 290 provided with the positioning dowel 292 received in an aperture in the inner leg of said leaf spring. On each side of the leaf spring and disposed in the window 78 coil springs 294 are provided supporting the bolster in parallel with the leaf spring 286. It is of course understood that the reverse arrangement may be used. That is, leaf springs may be disposed to embrace the coil springs disposed on the center line of the bolster.

In the construction shown in Figure 27, the bolster 296 extends through the respective windows of the spaced side frame 60 having guide cooperating portions 298 thereon. The bolster is provided with the outwardly extending portion 300 providing a seat on the upper chord thereof for the coil spring 302, said coil spring being supported on a suitable seat supported on the outer leg 304 of the semi-elliptic leaf spring assembly 306. The inner leg 308 thereof is supported on the suitable seat 310 provided on the bolster. The semi-elliptic leaf spring is provided with the spring band 312 supporting the leaf spring on the side frame. The leaf springs on opposite sides of the truck are arranged on opposite sides of the longitudinal center line of the bolster. The bolster is also supported on the side frame by means of the coil spring nests 314 so that a parallel arrangement of springs of different character is provided, the springs of the same character being arranged on different sides of the longitudinal center line, preventing tipping of the bolster in operation. It is of course understood that the coil springs 302 may be disposed inwardly of the side frame instead of outwardly, and springs of different length may also be used.

In the constructions shown in Figures 28 to 43 inclusive, transoms are used on which bolsters are swingably or rockably mounted.

In the constructions shown in Figures 28, 29, 32, 33, 36, 37, 40 and 41, the bolsters 316 are provided with depending outwardly sloping brackets 318 having sockets 320 for the reception of the cross members 322 of the swing hangers 324, the cross members being mounted on the swing hanger links 326 pivoted to the transoms at 328.

In the constructions shown in Figures 28 and 29, the transom 330 extends through the window 68 in the side frame, and is provided with column guide cooperating members 332. The transoms are provided with spaced members 334 between which the bolster is swung, the end wall 336 serving as a stop to limit transverse movement thereof. The bolster is provided with the end connecting member 338 provided with the seat 340, said seat having a depending positioning dowel 342 receivable in a suitable aperture in the outer leg 344 of the semi-elliptic leaf spring assembly 346. The inner leg 348 is apertured for the reception of the depending positioning dowel 350 provided on the seat 352 disposed on the transom. The semi-elliptic leaf spring is provided with the spring band 84 supported on the seat 88. The spring band is provided with the coil spring seat 354 on which the coil spring 356 is mounted, the coil spring being in supporting relation to the seat 358 provided on the transom, the assembly being maintained in operative position by means of the bolt 360.

In the construction shown in Figure 28, the outer leg 344 of the semi-elliptic leaf spring assembly is shorter than the inner leg 348, whereas in the construction shown in Figure 29 the long leg 348 is disposed outwardly and the short leg 344 is disposed inwardly, the cooperating parts of the assembly being correspondingly formed.

In the construction shown in Figures 30, 31, 34, 35, 38, 39, 42 and 43, the bolster 364 is provided with the roller track 361 whereby the bolster is rockably supported on the rocker member 358 supported on the cooperating rocker seat 361, the rocker being provided with positioning means 362 receivable in suitable apertures formed in the bolster and track 361. The rocker is disposed so that the axis extends upwardly and inwardly whereby the bolster is self-centering.

In the constructions shown in Figures 30 and 31, the transom 364 is provided with the spaced members embracing the bolster, said members being connected by means of the track 361, the bolster extending through the window 68 provided with the seat 366. The seat 366 is provided with the seat member 368 provided with the depending positioning dowel 370 receivable in a suitable aperture provided in the outer leg 372 of the semi-elliptic leaf spring assembly 374. The inner leg 376 of the semi-elliptic leaf spring assembly is apertured for the reception of the positioning dowel 378 of the seat member 380 provided on the transom. The leaf spring assembly 374 is provided with the spring band 84 supported on the seat 88. As before, the spring band is provided with the seat 354 on which the coil spring 356 is mounted, the coil spring seat supporting the transom at the seat 382, the positioning bolt 360 being also provided.

In the construction shown in Figure 30, the outer leg 372 is shorter than the inner leg 376, whereas in the construction shown in Figure 31 the outer leg 376 is the long leg and the inner leg 372 is the short leg.

In the constructions shown in Figures 32 and 33 the transom 384 is provided with the spaced members between which the bolster 316 is swung and extends through the window 68, being provided with the column guide cooperating members 386. The transom is provided with the seat member 388 having the seat 390, the seat being provided with the depending positioning dowel 392 receivable in a suitable aperture formed in the outer leg 394 of the semi-elliptic leaf spring assembly 396. The inner leg 398 thereof is provided with the coil spring seat 400 positioned thereon by means of the depending dowel 402, the seat 400 being provided with the coil spring 404 disposed between the seat member and the seat 406 provided on the transom, a suitable positioning bolt 408 being provided between the seats. The semi-elliptic leaf spring assembly is provided with the spring band 84 supported on the seat 86.

In the construction shown in Figure 32, the outer leg 394 is the shorter leg, whereas in the construction shown in Figure 33 the outer leg 396 is the longer leg.

The construction shown in Figure 36 differs from that shown in Figure 33 only in that the spring band 84 is provided with the coil spring seat 354 on which the coil spring 356 is mounted, the coil spring serving to support the transom at the spring seat 358, the positioning bolt 360 being provided to facilitate assembly. The outer leg 394 in this case is the shorter leg, whereas the longer leg 396 is disposed inwardly.

The construction shown in Figure 37 differs from that shown in Figure 33 only in that the coil spring seat 354 is provided on the spring band 84, the coil spring 356 being disposed between said seat and the seat 358 provided on the transom 410, the bolt 360 being likewise provided.

The construction shown in Figure 40 differs from that shown in Figure 36 only in that the outer leg 394 of the leaf spring assembly 398 is provided with the coil spring seat 412 on which the coil spring 414 is mounted, the coil spring 414 supporting the transom 416 at the seat 418, the assembly bolt 420 being disposed between the seats 418 and 412.

In the construction shown in Figure 40, the outer leg 394 is the shorter leg, whereas the inner leg 396 is the longer.

The construction shown in Figure 41 differs from that shown in Figure 37 only in that the longer outer leg 396 is provided with the coil spring seat 422 positioned thereon by means of the positioning dowel 424, and the coil spring 426 is disposed between said seat and the seat 428 provided on the transom 416.

In the construction shown in Figure 34, the transom 430 is provided with the spaced members between which the bolster is disposed and extends through the window 68, being provided with the column guide cooperating members 432. The transom is provided with the seat portion 434 on which the seat 436 is mounted, the seat being provided with the depending positioning dowel 438 receivable in a suitable aperture in the outer leg 440 of the semi-elliptic leaf spring 442. The inner leg 444 thereof is provided with a coil spring seat 446 positioned thereon by means of the dowel 448. The coil spring 450 is mounted on said seat and supports the transom at the seat 452, the positioning bolt 454 being provided between the seats. The semi-elliptic leaf spring assembly is provided with the spring band 84 provided on the seat 88. In this construction the outer leg 440 is shorter than the inner leg 442, whereas in Figure 35 the outer leg 442 is longer than the inner leg 440.

The construction shown in Figure 38 differs from that shown in Figure 34 only in that the coil spring seat 456 is provided on the spring band 84, the coil spring 458 being seated thereon and supporting the transom at the seat 460, the positioning bolt 462 being provided. In this case the outer leg 440 is longer than the inner leg 442.

The construction shown in Figure 39 differs from that shown in Figure 38 only in that the outer leg 442 is longer than the inner leg 440.

The construction shown in Figure 42 differs from that shown in Figure 38 only in that the outer shorter leg 440 is provided with the coil spring seat 466 on which the coil spring 468 is mounted. The coil spring is disposed between the seat 466 and the seat 470 provided on the transom 472, the positioning bolt 474 being likewise provided.

The construction shown in Figure 43 differs from that shown in Figure 42 only in that the longer leg 442 is disposed outwardly, and the shorter leg 440 is disposed inwardly of the side frame.

In the construction shown in Figures 44 and 45, the bolster 476 extends into the window of the side frame 60, being provided with the column guide cooperating members 478. The bolster is adapted to be supported on springs of different character. The bolster is provided with the coil spring seats 480 on which the spaced coil spring assemblies 482 are seated, the coil springs being supported on the seat portion 484 of the tension member 70. The full elliptic spring assemblies 486 are provided disposed inwardly of the truck, that is, inwardly of the coil spring assemblies 482, being supported on the coil spring 484 through the lower spring band 488 and supporting the bolster through the upper spring band 490.

In the assembly shown in Figure 46, the widened spring seat 492 of the side frame 60 supports the nests of coil springs 494 disposed inwardly of the full elliptic springs 496, the spring supporting the bolster through the spring band 498 and supported on the spring seat 492 through a spring band similar to that shown at 488 in Figure 44. The springs in Figures 44 and 46, therefore, are disposed in parallel.

It is of course understood that semi-elliptic springs may be replaced by full elliptic springs and suitable seats may be provided on the spaced columns 66.

In the constructions shown in Figures 47 to 50 inclusive, the bolsters 500 and 502 are provided with column guide cooperating guides 66. The bolsters are adapted to be supported on the spring seat 506 of the tension member 508. In the construction shown in Figures 47 and 48 the bolster is supported on the nests of interlaced coil springs 510. In this case four coil springs of steep pitch are provided, and are assembled as by a screw thread action. With this assembly a lighter spring assembly may be provided. In the construction shown in Figure 47, a full elliptic or semi-elliptic leaf spring assembly 512 is disposed between the coil springs thereof. Of course, coil springs may be disposed between spaced full elliptic or semi-elliptic springs.

In the construction shown in Figure 51, the bolster 514 is provided with the column guide cooperating members having sliding cooperation with the column guide 66. The bolster is adapted to be supported on the spring seats 518 of the tension member 70 through the coil springs 520, or by full elliptic or semi-elliptic springs, or a combination thereof. The tension member serves to support a housing 522 on which the coil springs 520 are seated to maintain the housing in proper position, suitable dowels 524 being also provided. The housing is adapted to accommodate coil spring nests 526 mounted on the seat 528 of the housing and on the movable head 530. The head is provided with the bolt 532 extending through the housing and being secured to the bolster 514. It will thus be seen that when the spring 546 is provided with an initial compression by the head 530 upward movements of the bolster after compression of the springs 520 will be snubbed by action of the coil springs 526.

In the construction shown in Figure 52, the bolster 534 is provided with the column guide cooperating portions 536 and is adapted to be resiliently supported on the spring-seat 538 of the tension member 540 by means of the coil springs 542, though semi-elliptic or full elliptic springs may be provided. The tension member 544 is provided with the spring seat 546 on which the full elliptic spring 548 is mounted through the spring band 550, the spring band 552 thereof being mounted on the bolster 534. With a construction of this sort, the full elliptic spring, or in the case of a semi-elliptic spring being used, provides a snubber for the upward movement of the bolster 334.

In the constructions shown in Figure 53, the bolster 554 is provided with column guide cooperating portions 556, and is resiliently mounted on the coil springs 558 and the semi-elliptic or full elliptic spring 560, it being understood that the coil springs may be disposed to be embraced by the leaf springs. The springs 558 and 560 are supported on the spring seat 538 provided with the spring seat 546 and the coil springs 562, or a combination of coil and elliptic or coil and semi-elliptic springs may be used to provide snubbing means as already described.

In the construction shown in Figure 54, the bolster 564 is provided with the column guide cooperating portions 566 which are resiliently supported as by means of the coil springs 568 though any combination of springs may be used. The coil springs are supported on the spring plank 570 provided on the tension member 70. The tension member 70 and the compression member 60 are provided with outwardly extending brackets 572 and 574 between which brackets and the bracket 576 friction snubbing devices 578 are disposed. The friction devices are substantially triangularly disposed blocks, such as described in application Serial No. 601,613, Alfred H. Oelkers, filed March 28, 1932. In this case both a shock absorbing and a snubbing device are provided. That is, in operation, the bolster is resiliently supported on the springs 578 and is resiliently and frictionally supported on the shock absorbing assembly 580, the opposed coil springs 582 serving to resiliently resist movement of the friction blocks, the coil springs 584 similarly resisting upward movement of the bolster by means of the snubbing assembly 586 disposed above the bolster.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a car truck, the combination of a side frame including tension and compression members and integral connecting column guides, a load carrying member cooperating with said column guides, a transversely arranged semi-elliptic spring supported on said tension member between said column guides at a single point and supporting said load carrying member at a plurality of points, said spring having a long and a short leg, the short leg being disposed outwardly of the side frame.

2. In a car truck, the combination of a side frame including tension and compression members and integral connecting column guides, a load carrying member cooperating with said column guides, a transversely arranged semi-elliptic spring supported on said tension member between said column guides at a single point and supporting said load carrying member at a plurality of points, said spring having a long and a short leg, the short leg being disposed inwardly of the side frame.

3. In a car truck, the combination of a side frame including tension and compression members and integral connecting column guides, a bolster cooperating with said column guides, a transversely arranged semi-elliptic spring supported on said tension member between said column guides at a single point and supporting said bolster at a plurality of points, said spring having a long and a short leg, the short leg being disposed outwardly of the side frame.

4. In a car truck, the combination of a side frame including tension and compression members and integral connecting column guides, a bolster cooperating with said column guides, a transversely arranged semi-elliptic spring supported on said tension member between said column guides at a single point and supporting said bolster at a plurality of points, said spring having a long and a short leg, the short leg being disposed inwardly of the side frame.

5. In a car truck, the combination of a side frame including tension and compression members and integral connecting column guides, a bolster cooperating with said column guides, a transversely arranged semi-elliptic spring supported on said tension member between said column guides at a single point, said spring having a long and a short leg, the short leg being disposed outwardly of the side frame, a coil spring interposed between each of said legs and said bolster, and a coil spring disposed in supporting relation to said bolster substantially in a vertical plane to the point of support of said first named spring on said tension member.

6. In a car truck, the combination of a side frame including tension and compression members and integral connecting column guides, a bolster cooperating with said column guides, a semi-elliptic spring supported on said tension member between said column guides at a single point, said spring having a long and a short leg, the long leg being disposed outwardly of the side frame, a coil spring interposed between each of said legs and said bolster, and a coil spring disposed in supporting relation to said bolster substantially in a vertical plane to the point of support of said first named spring on said tension member.

7. In a car truck, the combination of a side frame including tension and compression members and integral connecting column guides, a bolster cooperating with said column guides, a transversely arranged semi-elliptic spring supported on said tension member between said column guides at a single point, said spring having a long and a short leg, the short leg being disposed outwardly of the side frame, the long leg directly supporting the bolster, the short leg supporting said bolster through a coil spring, and a coil spring disposed in supporting relation between the leaf spring and bolster and disposed substantially in a plane through the point of contact of said first named spring with the tension member.

8. In a car truck, the combination of a side frame including tension and compression members and integral connecting column guides, a bolster cooperating with said column guides, a transversely arranged semi-elliptic spring supported on said tension member between said column guides at a single point, said spring having a long a short leg, the long leg being disposed outwardly of the side frame, the short leg directly supporting the bolster, the long leg supporting said bolster through a coil spring, and a coil spring disposed in supporting relation between the leaf spring and bolster and disposed substantially in a plane through the point of contact of said first named spring with the tension member.

9. In a car truck, the combination of a side frame including tension and compression members and integral connecting column guides, a bolster cooperating with said column guides, a transversely arranged semi-elliptic spring supported on said tension member between said column guides at a single point, said spring having a long and short leg, the short leg being disposed outwardly of the side frame, the long leg directly supporting the bolster, the short leg supporting said bolster through a coil spring.

10. In a car truck, the combination of a side frame including tension and compression members and integral connecting column guides, a bolster cooperating with said column guides, a transversely arranged semi-elliptic spring supported on said tension member between said column guides at a single point, said spring having a long and short leg, the long leg being disposed outwardly of the side frame, the short leg directly supporting the bolster, the long leg supporting said bolster through a coil spring.

11. In a car truck, the combination of a side frame including tension and compression members and integral connecting column guides, a bolster cooperating with said column guides, a transversely arranged semi-elliptic spring supported on said tension member between said column guides at a single point, said spring having a long and short leg, the long leg being disposed outwardly of the side frame and directly supporting said bolster, said short leg extending inwardly of the side frame and supporting said bolster through a coil spring, and a coil spring disposed in supporting relation between said first named spring and said bolster and disposed substantially in the plane of the point of contact between said first named spring and said tension member.

12. In a car truck, the combination of a side frame including tension and compression members and integral connecting column guides, a bolster resiliently supported on said tension member between said column guides, a transversely arranged semi-elliptic spring supported on said tension member between said column guides and between said resilient means, said semi-elliptic spring being supported at a single point and provided with a long and a short leg, the short leg extending outwardly of the side frame and supporting said bolster through a coil spring, the long leg extending inwardly of the side frame and directly supporting said bolster.

13. In a car truck, the combination of a side frame including tension and compression members and integral connecting column guides, a bolster resiliently supported on said tension member between said column guides, a transversely arranged semi-elliptic spring supported on said tension member between said column guides and between said resilient means, said semi-elliptic spring being supported at a single point and provided with a long and a short leg, the long leg extending outwardly of the side frame and supporting said bolster through a coil spring, the short leg extending inwardly of the side frame and directly supporting said bolster.

14. In a car truck, the combination of a side frame including tension and compression members and integral connecting column guides, a bolster cooperating with said column guides and resiliently supported on said tension member, a transversely arranged semi-elliptic spring supported on said tension member between said column guides and between said resilient means, said spring being supported on said tension member at a single point and having a long and a short leg, the short leg being disposed outwardly of the side frame and supporting said bolster through a coil spring, the long leg being disposed inwardly and directly supporting the bolster, and a coil spring disposed in supporting relation between said first named spring and said bolster substantially in the vertical plane of the point of support of the first named spring on said tension member.

15. In a car truck, the combination of a side frame including tension and compression members and integral connecting column guides, a bolster cooperating with said column guides and resiliently supported on said tension member, a transversely arranged semi-elliptic spring supported on said tension member between said column guides and between said resilient means, said spring being supported on said tension member at a single point and having a long and a short leg, the long leg being disposed outwardly of the side frame and supporting said bolster through a coil spring, the short leg being disposed inwardly and directly supporting the bolster, and a coil spring disposed in supporting relation between said first named spring and said bolster substantially in the vertical plane of the point of support of the first named spring on said tension member.

16. In a truck, the combination of a side frame having spaced tension and compression members and connecting spaced column guides forming a bolster opening, a bolster extending through said opening and slidably cooperating with said guides, and a spring supporting said bolster on said side frame at a plurality of points, the distance between the point of support of said spring and the points of support of said bolster being unequal.

17. In a truck, the combination of a side frame having spaced tension and compression members and connecting spaced column guides forming a bolster opening, a bolster extending through said opening and slidably cooperating with said guides, and a leaf spring supporting said bolster on said side frame at a plurality of points, the distances between the point of support of said spring and the points of support of said bolster being unequal.

18. In a truck, the combination of a side frame having spaced tension and compression members and connecting spaced column guides forming a bolster opening, a bolster extending through said opening and slidably cooperating with said guides, and an unbalanced leaf spring supporting said bolster on said side frame, said spring supported on said side frame at one point and supporting said bolster at a plurality of points, said leaf spring including a short leg and a long leg, said short leg supporting said bolster onwardly of said side frame.

19. In a truck, the combination of a side frame having spaced tension and compression members and connecting spaced column guides forming a bolster opening, a bolster extending through said opening and slidably cooperating with said guides, and an unbalanced leaf spring supporting said bolster on said side frame, said spring supported on said side frame at one point and supporting said bolster at a plurality of points, said leaf spring including a short leg and a long leg, said short leg supporting said bolster outwardly of said side frame and said long leg supporting said bolster inwardly of said side frame.

20. In a truck, the combination of a side frame having spaced tension and compression members and connecting spaced column guides forming a bolster opening, a bolster extending through said opening and slidably cooperating with said guides, and an unbalanced leaf spring supporting said bolster on said side frame, said spring supported on said side frame at one point and supporting said bolster at a plurality of points, said leaf spring including a short leg and a long leg, said long leg supporting said bolster outwardly of said side frame and said short leg supporting said bolster inwardly of said side frame.

21. In a truck, the combination of a side frame having spaced tension and compression members and connecting spaced column guides forming a bolster opening, a bolster extending through said opening and slidably cooperating with said guides, an unbalanced leaf spring supporting said bolster on said side frame, said spring supported on said side frame at one point and supporting said bolster at a plurality of points, said leaf spring including a short leg and a long leg, said short leg supporting said bolster outwardly of said side frame, and resilient means disposed between one of said legs and said bolster.

22. In a truck, the combination of a side frame having spaced tension and compression members and connecting spaced column guides forming a bolster opening, a bolster extending through said opening and slidably cooperating with said guides, an unbalanced leaf spring supporting said bolster on said side frame, said spring supported on said side frame at one point and supporting said bolster at a plurality of points, said leaf spring including a short leg and a long leg, said short leg supporting said bolster outwardly of said side frame, and resilient means disposed between said short leg and said bolster.

23. In a truck, the combination of a side frame having spaced tension and compression members and connecting spaced column guides forming a bolster opening, a bolster extending through said opening and slidably cooperating with said guides, an unbalanced leaf spring supporting said bolster on said side frame, said spring supported on said side frame at one point and supporting said bolster at a plurality of points, said leaf spring including a short leg and a long leg, said short leg supporting said bolster outwardly of said side frame, and resilient means disposed between said side frame and said bolster.

24. In a truck, the combination of a side frame having spaced tension and compression members and connecting spaced column guides forming a bolster opening, a bolster extending through said opening and slidably cooperating with said guides, an unbalanced leaf spring supporting said bolster on said side frame, said spring supported on said side frame at one point and supporting said bolster at a plurality of points, said leaf spring including a short leg and a long leg, said short leg supporting said bolster outwardly of said side frame, and resilient means disposed between said spring and bolster.

25. In a truck, the combination of a side frame having spaced tension and compression members and connecting spaced column guides forming a bolster opening, a bolster extending through said opening and slidably cooperating with said guides, an unbalanced leaf spring supporting said bolster on said side frame, said spring supported on said side frame at one point and supporting said bolster at a plurality of points, said leaf spring including a short leg and a long leg, said long leg supporting said bolster outwardly of said side frame, and resilient means disposed between one of said legs and said bolster.

26. In a truck, the combination of a side frame having spaced tension and compression members and connecting spaced column guides forming a bolster opening, a bolster extending through said opening and slidably cooperating with said guides, an unbalanced leaf spring supporting said bolster on said side frame, said spring supported on said side frame at one point and supporting said bolster at a plurality of points, said leaf spring including a short leg and a long leg, said long leg supporting said bolster outwardly of said side frame, and resilient means disposed between said short leg and said bolster.

27. In a truck, the combination of a side frame having spaced tension and compression members and connecting spaced column guides forming a bolster opening, a bolster extending through said opening and slidably cooperating with said guides, an unbalanced leaf spring supporting said bolster on said side frame, said spring supported on said side frame at one point and supporting said bolster at a plurality of points, said leaf spring including a short leg and a long leg, said long leg supporting said bolster outwardly of said side frame, and resilient means disposed between said long leg and said bolster.

28. In a truck, the combination of a side frame having spaced tension and compression members and connecting spaced column guides forming a bolster opening, a bolster extending through said opening and slidably cooperating with said guides, an unbalanced leaf spring supporting said bolster on said side frame, said spring supported on said side frame at one point and supporting said bolster at a plurality of points, said leaf spring including a short leg and a long leg, said short leg supporting said bolster outwardly of said side frame, and resilient means disposed between one of said legs and said bolster, said resilient means including a coil spring.

29. In a car truck, the combination of a side frame, a bolster, and a leaf spring arranged substantially parallel to said bolster, said spring being supported on said side frame at a point and being provided with a long leg and a short leg for supporting said bolster, and resilient means mounted between one of said legs and said bolster.

30. In a car truck, the combination of a side frame, a bolster, and a leaf spring being supported on said side frame at a point and being provided with a long leg and a short leg for supporting said bolster, and a coil spring mounted between one of said legs and said bolster.

31. In a car truck, the combination of a side frame, a bolster, and a leaf spring arranged substantially parallel to said bolster, said spring being supported on said side frame at a point and being provided with a long leg and a short leg for supporting said bolster, and resilient means mounted between said spring and bolster.

32. In a car truck, the combination of a side frame, a bolster, and a leaf spring arranged substantially parallel to said bolster, said spring being supported on said side frame at a point and being provided with a long leg and a short leg for supporting said bolster, and coil springs mounted between said spring and bolster.

33. In a car truck, the combination of a side frame, a bolster, and a leaf spring arranged substantially parallel to said bolster, said spring being supported on said side frame at a point and being provided with a long leg and a short leg for supporting said bolster, and resilient means mounted between one of said legs and said bolster, said long legs being disposed outwardly of said side frame.

34. In a car truck, the combination of a side frame, a bolster, and a leaf spring arranged substantially parallel to said bolster, said spring being suppported on said side frame at a point and being provided with a long leg and a short leg for supporting said bolster, and resilient means mounted between one of said legs and said bolster, said short leg being disposed outwardly of said side frame.

35. In a car truck, the combination of a side frame, a load carrying member extending outwardly thereof, a semi-elliptic leaf spring supported on said side frame at a point and having legs extending inwardly and outwardly of said side frame and disposed in supporting relation to said load carrying member, the effective supporting leg length of said spring legs being unequal.

36. In a car truck, the combination of a side frame, a load carrying member extending outwardly thereof, a semi-elliptic leaf spring supported on said side frame at a point and having legs extending inwardly and outwardly of said side frame and disposed in supporting relation to said load carrying member, the effective supporting leg length of said spring legs being unequal and a metallic spring interposed between said load carrying member and said side frame.

37. In a car truck, the combination of a side frame, a load carrying member extending outwardly thereof, a semi-elliptic leaf spring supported on said side frame at a point and having legs extending inwardly and outwardly of said side frame and disposed in supporting relation to said load carrying member, the effective supporting leg length of said spring legs being unequal and a metallic spring interposed between said load carrying member and one leg of said leaf spring.

38. In a car truck, the combination of a side frame, a load carrying member extending outwardly thereof, a semi-elliptic leaf spring supported on said side frame at a point and having legs extending inwardly and outwardly of said side frame and disposed in supporting relation to said load carrying member, the effective supporting leg length of said spring legs being unequal and a metallic spring interposed between said load carrying member and said leaf spring.

Signed at Chicago, Illinois, this 17th day of June, 1932.

HOWARD SOMERVELL.